(12) United States Patent
Yu et al.

(10) Patent No.: US 10,528,889 B2
(45) Date of Patent: Jan. 7, 2020

(54) STEREOSCOPIC LEARNING FOR CLASSIFICATION

(71) Applicant: Futurewei Technologies, Inc., Plano, TX (US)

(72) Inventors: Jiangsheng Yu, San Jose, CA (US); Hui Zang, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 958 days.

(21) Appl. No.: 15/081,278

(22) Filed: Mar. 25, 2016

(65) Prior Publication Data

US 2017/0278013 A1    Sep. 28, 2017

(51) Int. Cl.
*G06N 20/00*    (2019.01)
*G06F 16/28*    (2019.01)

(52) U.S. Cl.
CPC .......... *G06N 20/00* (2019.01); *G06F 16/283* (2019.01); *G06F 16/285* (2019.01)

(58) Field of Classification Search
None
See application file for complete search history.

(56) References Cited

U.S. PATENT DOCUMENTS

| | | |
|---|---|---|
| 7,505,866 B2 | 3/2009 | Chen et al. |
| 7,698,235 B2 | 4/2010 | Kuroiwa |
| 9,053,436 B2 | 6/2015 | Dalessandro et al. |
| 9,317,785 B1 * | 4/2016 | Moon ................ G06K 9/00234 |
| 2003/0229630 A1 * | 12/2003 | Kamath ............... G06K 9/6282 |
| 2006/0095521 A1 * | 5/2006 | Patinkin ............... G06Q 10/107 |
| | | 709/206 |
| 2008/0063265 A1 * | 3/2008 | Sathyanarayana ... G06K 9/6228 |
| | | 382/159 |
| 2009/0307771 A1 | 12/2009 | Rajan et al. |

(Continued)

FOREIGN PATENT DOCUMENTS

| | | |
|---|---|---|
| CN | 103632168 A | 3/2014 |
| CN | 105373800 A | 3/2016 |

OTHER PUBLICATIONS

Ahn, Hongshik, Hojin Moon, Melissa J. Fazzari, Noha Lim, James J. Chen, and Ralph L. Kodell. "Classification by ensembles from random partitions of high-dimensional data." Computational Statistics & Data Analysis 51, No. 12 (2007): 6166-6179. (Year: 2007).*

(Continued)

*Primary Examiner* — Scott A. Waldron
*Assistant Examiner* — Casey R. Garner
(74) *Attorney, Agent, or Firm* — Vierra Magen Marcus LLP

(57) ABSTRACT

A processing device and method of classifying data are provided. The method comprises the computer-implemented steps of selecting a M number of model sets, a R number of data representation sets, and a T number of sampling sets, generating a M*R*T number of classifiers comprising a three-dimensional (3D) array of classifiers, testing each individual classifier in the 3D array of classifiers on a testing set to obtain accuracy scores for the each individual classifier, and assigning a weight value to the each individual classifier corresponding to each accuracy score, wherein the 3D array of classifiers comprises a 3D array of weighted classifiers.

28 Claims, 16 Drawing Sheets

(56) References Cited

U.S. PATENT DOCUMENTS

| | | | |
|---|---|---|---|
| 2010/0036782 A1* | 2/2010 | Zhao | G06K 9/6217 |
| | | | 706/13 |
| 2010/0241596 A1* | 9/2010 | Lee | G06N 20/00 |
| | | | 706/11 |
| 2012/0052473 A1* | 3/2012 | Kozakaya | G09B 5/00 |
| | | | 434/322 |
| 2012/0084859 A1* | 4/2012 | Radinsky | G06F 21/56 |
| | | | 726/23 |
| 2015/0278707 A1 | 10/2015 | Beymer et al. | |
| 2016/0063396 A1 | 3/2016 | Cheng et al. | |
| 2017/0032276 A1* | 2/2017 | Sukhanov | G06F 16/41 |
| 2017/0147941 A1* | 5/2017 | Bauer | G06N 20/00 |
| 2018/0046942 A1* | 2/2018 | Conroy | A61B 5/7267 |
| 2018/0300631 A1* | 10/2018 | Roy | G06N 3/0454 |

OTHER PUBLICATIONS

PCT/CN2017/077134, ISR, Jun. 21, 2017.
Blanzieri, Enrico, et al., "A Survey of Learning-based Techniques of Email Spam Filtering," University of Trento, Italy, Information Engineering and Computer Science Dept., Jan. 2008, 30 pages.

* cited by examiner

Sample (i)

| Class = 0/1 | |
|---|---|
| Feature | Value |
| F1 | 0 / 1 |
| F2 | 0 / 1 |
| ... | |
| FD | 0 / 1 |

FIG. 13

STEREOSCOPIC LEARNING FOR CLASSIFICATION

BACKGROUND

Modeling techniques such as machine learning are useful in many applications, such as email spam filtering, predicting fraudulent credit card charges, or analyzing customer churn, such as in a wireless carrier network, for example. For instance, in the case of credit card charges, data such as the amount of the charge, the geographic location, and the store identifier can be used by a model to predict whether the charge is fraudulent. In some cases, ensemble learning can be used where the predictions of multiple models are combined.

BRIEF SUMMARY

A processing device and method of classifying data are provided. The method comprises the computer-implemented steps of selecting a M number of model sets, a R number of data representation sets, and a T number of sampling sets, generating a M*R*T number of classifiers comprising a three-dimensional (3D) array of classifiers, testing each individual classifier in the 3D array of classifiers on a testing set to obtain accuracy scores for each individual classifier, and assigning a weight value to each individual classifier corresponding to each accuracy score, wherein the 3D array of classifiers comprises a 3D array of weighted classifiers.

A processing device is provided, comprising a non-transitory memory storage comprising instructions and one or more processors in communication with the memory. The one or more processors execute the instructions to select a M number of model sets, a R number of data representation sets, and a T number of sampling sets, generate a M*R*T number of classifiers comprising a three-dimensional (3D) array of classifiers, test each individual classifier in the 3D array of classifiers on a testing set to obtain accuracy scores for each individual classifier, and assign a weight value to each individual classifier corresponding to each accuracy score, wherein the 3D array of classifiers comprises a 3D array of weighted classifiers.

BRIEF DESCRIPTION OF THE DRAWINGS

Aspects of the present disclosure are illustrated by way of example and are not limited by the accompanying figures for which like references indicate elements.

FIG. 13 depicts an example of features in a sample.

DETAILED DESCRIPTION

The disclosure relates to technology for classifying samples of data using multiple models.

Machine learning in general uses a selected data representation and a selected model to process a data sample to generate a classifier. The generated classifier can be used for future prediction and learning on similar data sets. As part of the classifier generation, the selected data representation and selected model are also operated on a testing set to evaluate the accuracy of the selected data representation and the selected model. The testing set is therefore used to evaluate the suitability of the selected data representation and the selected model for such machine learning.

The innovation disclosed herein generates multiple classifiers, using multiple data representations, multiple sampling sets, and multiple models. The innovation disclosed herein in some examples generates in essence a three-dimensional (3D) array of classifiers.

Figure 1:
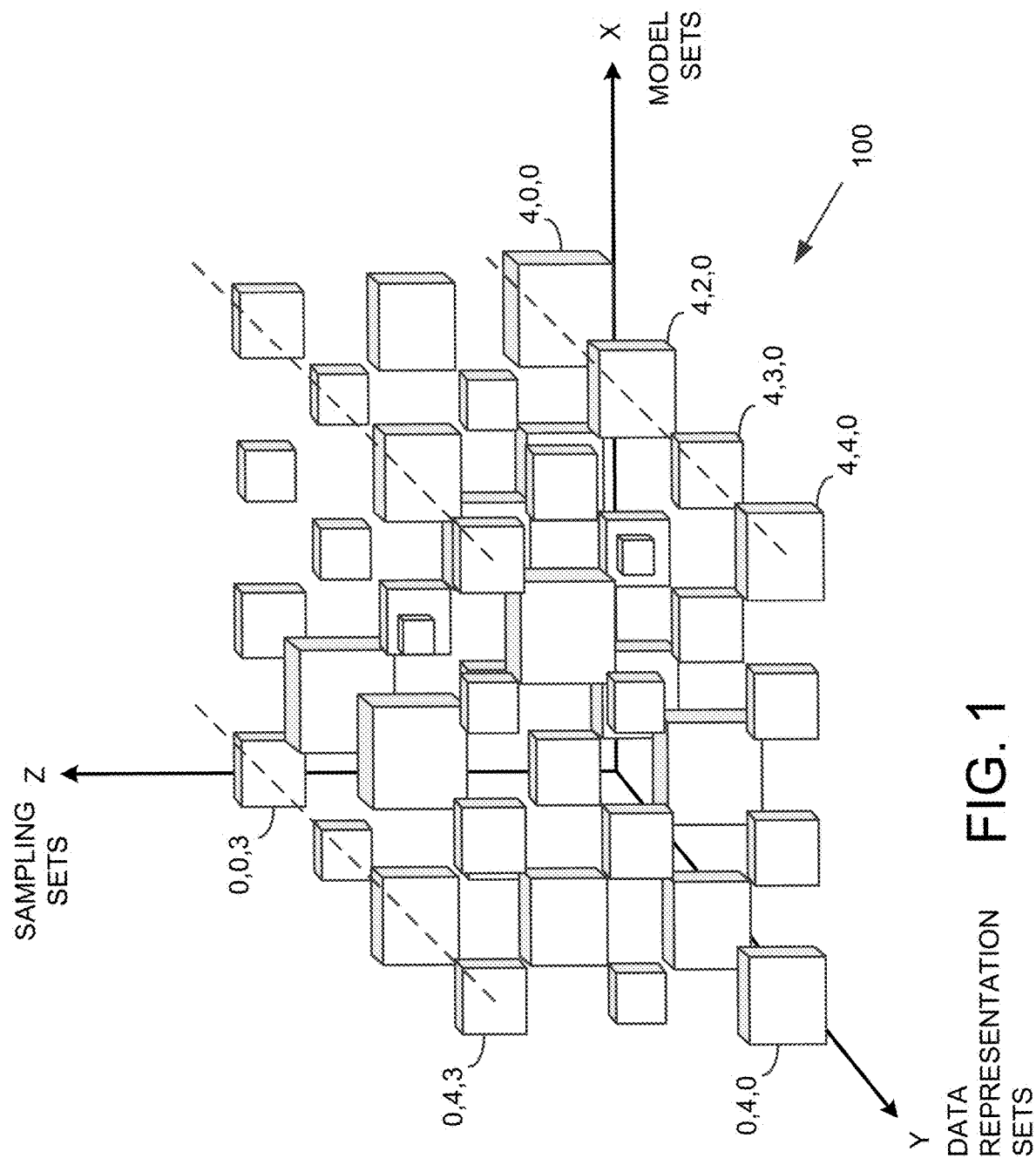
FIG. 1 shows a three-dimensional (3D) array of classifiers according to an example.

FIG. 1 shows a three-dimensional (3D) array of classifiers 100 according to an example. The 3D array of classifiers 100 is a representation comprising M*R*T classifiers, in which each individual classifier is generated according to a particular classification model, using a particular data representation set, and trained on a particular sampling set. In the 3D array of classifiers, in some examples the X-axis corresponds to model (or learner) sets, the Y-axis corresponds to data representation sets, and the Z-axis corresponds to sampling sets. Classifier elements along the X-axis represent M number of model sets. Classifier elements along the Y-axis represent R number of data representation sets. Classifier elements along the Z-axis represent T number of sampling sets. The 3D array of classifiers presents users with various possibilities that the user can select for processing data sets, wherein the 3D array possesses a more highly refined accuracy and suitability for processing data sets.

Individual classifiers within the 3D array of classifiers are tested against a testing set and are scored according to their individual accuracy in processing the testing set. The testing result for a particular classifier comprises the accuracy of that particular classifier when operated on a particular testing data set. The accuracy scores are used to generate weightings for each individual classifier. The relative weighting values are represented in the figure by physical size, wherein classifier (4,0,0) is larger than (and has a greater weight) than classifiers (4,2,0) and (4,4,0). In turn, the classifiers (4,2,0) and (4,4,0) have greater weight than classifier (4,3,0).

The weights are based on the accuracy scores. For instance, the weights in some examples comprise normalized accuracies, or normalized squared accuracies. Here, "normalized" means that the sum of all weights in the 3D array of classifiers is equal to 1. In general, a function can be defined that maps the accuracies to non-negative weighting values, subject to normalization. In some examples, the accuracies can include values of zero (such as where they fall below a predefined threshold). However, weights of zero value can be updated and changed by the normalization process. Consequently, individual classifiers with poor performance will be assigned relatively small weights, and their contribution to the final prediction will therefore be relatively small.

Figure 3:
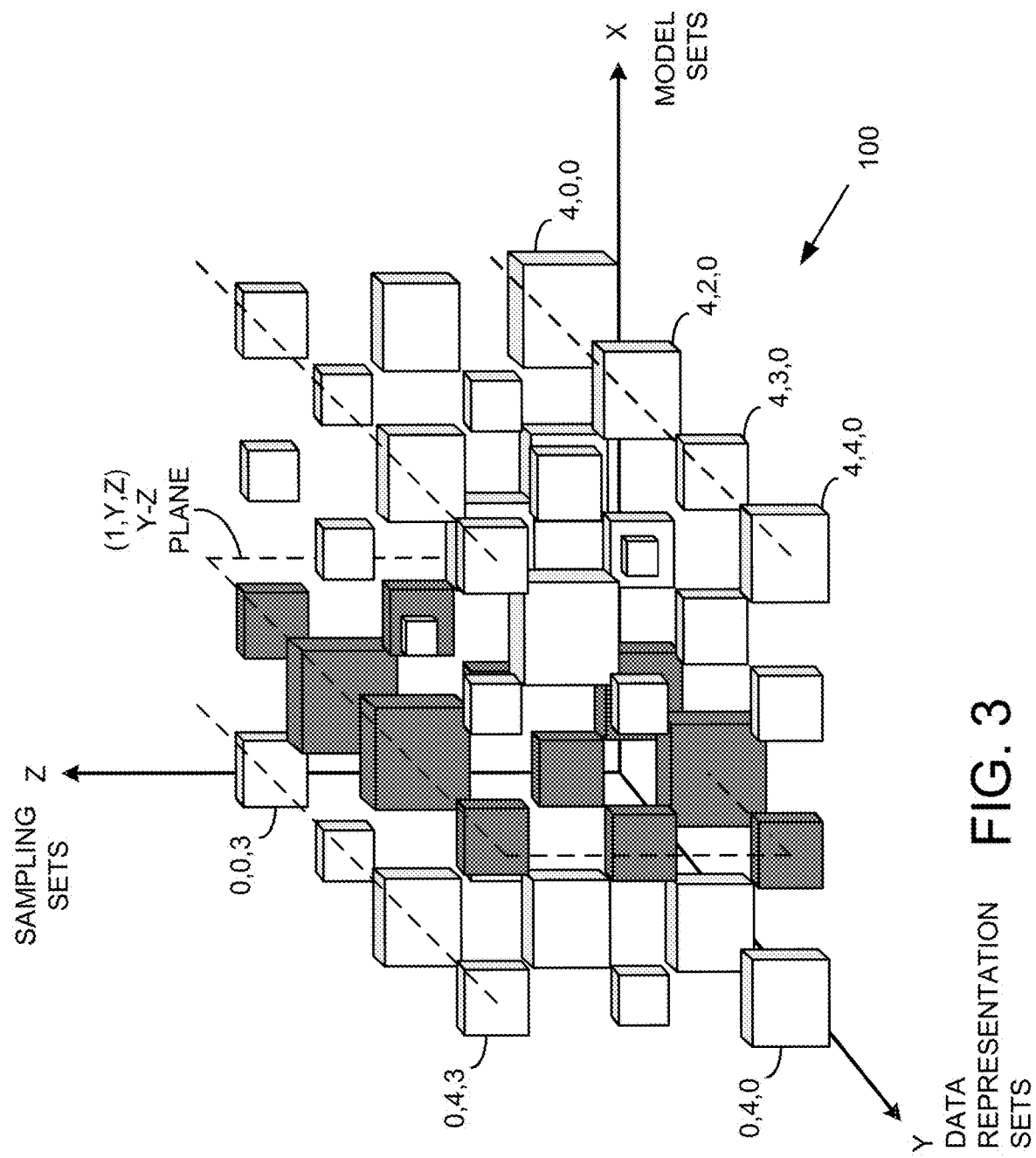

The figure shows a 3D array of classifiers according to an example embodiment. The figure shows an X-axis, wherein a model set of the 3D array changes along the X-axis, in this example (i.e., all classifiers in a particular YZ plane have a common model set, as is shown in FIG. 3). The data representation set of the 3D array changes along the Y-axis, in this example. The sampling set of the 3D array changes along the Z-axis, in this example. In addition, the representation of the size of each classifier denotes the accuracy score (and weighting) of each classifier. The weight determines how much effect the particular classifier has on data when the particular classifier is used in operation. In use, all of the classifiers in the 3D array of classifiers are used in ensemble learning.

It is assumed that each classifier returns a result in the format of a discrete distribution over all categories (so the sum of all probabilities is equal to 1). The categories comprise predetermined categories or classifications defined by each data representation set, in some examples. The 3D array of classifiers can operate on a subsequent data set to classify individual data elements into the predetermined categories. Taking spam e-mail identification, for example, the predetermined categories can comprise spam (SP) and non-spam (non-SP). In this example, the result is a binary determination of SP or non-SP, wherein for any new sample, each binary classifier returns a prediction in the format of two-point distribution over SP and non-SP. For example, a classifier C_1 may return the prediction result of (1*SP+ 0*non-SP), which means the probability of SP is 1 and the probability of non-SP will be 0. Another classifier C_2 may return the prediction result of (0.01*SP+0.99*non-SP), which means the probability of spam is 0.01.

Supposing there are only two classifiers C_1 and C_2, with weights 0.8 and 0.2 respectively, then the final prediction result of C_1 and C_2 is:

$$0.8*(1SP+0\ non\text{-}SP)+0.2*(0.01SP+0.99\ non\text{-}SP)=$$
$$0.1602SP+0.198\ non\text{-}SP \qquad (1)$$

Obviously, the final result is also a two-point distribution over spam and non-spam. The multi-classification is similar.

For any new observation, the ensemble of M*R*T classifiers returns a prediction in the format of a discrete distribution over categories. For example, for identification of e-mail spam, the generation of the 3D array of classifiers can employ suitable data representation sets, suitable models, and suitable sampling sets. The generation of the 3D array of classifiers can employ three classification models, such as support vector machine (SVM), logistic regression, and decision tree, for example. The generation of the 3D array of classifiers can employ four data representation methods, such as method 1 only considers the nouns in the documents, methods 2 only considers the verbs, method 3 only considers the adjectives, and method 4 only considers the timestamps, for example. The generation of the 3D array of classifiers can employ 1,000 samples (i.e., e-mails) with labels "spam" or "non-spam".

Figure 2:
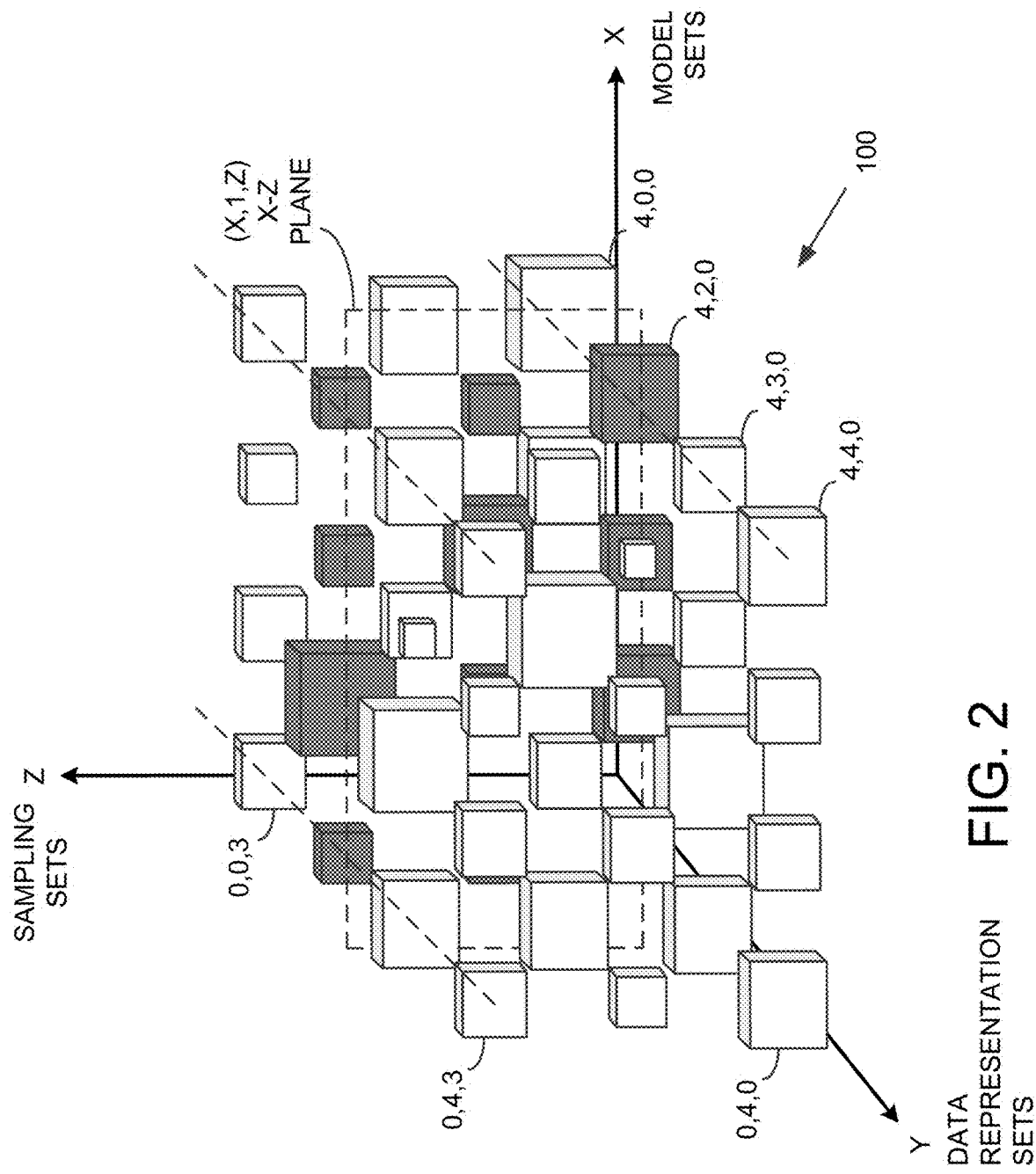
FIGS. 2 and 3 illustrate the three-dimensional nature of the 3D array of classifiers.

FIGS. 2 and 3 illustrate the three-dimensional nature of the 3D array of classifiers 100. Each slice or plane through the 3D array of classifiers 100 corresponds to a particular data representation set, a particular sampling set, or a particular model set. In FIG. 2, a XZ plane is shown for a Y value of Y=1, or a XZ plane (X,1,Z), wherein the individual classifiers within the XZ plane (X,1,Z) are generated according to various model sets and sampling sets, but using only one data representation set. In FIG. 3, a YZ plane is shown for a X value of X=1, or a YZ plane (1,Y,Z), wherein the individual classifiers within the YZ plane (1,Y,Z) are generated according to various data representation sets and sampling sets, but using only one model set.

The distribution of accuracies on one YZ slice can be studied to see the performance of a particular model. Similarly, the distribution of accuracies on one XZ slice can be studied to see the performance of a particular data representation. In general, "large mean and small variance" results in good performance.

Using stereoscopic learning, in the sampling step, the process samples 900 emails with replacement as training data, for example, and lets complements be the testing data. The training/testing data is represented in four distinct ways, having four pairs of (training dataset, testing dataset). Each model is trained on each training dataset, generating 3*4=12 classifiers. These twelve classifiers are tested on the corresponding testing data. These steps are independently repeated over five rounds, for example, generating 3*4*5=60 classifiers, with corresponding testing accuracies.

The result of stereoscopic learning in this example is sixty classifiers and sixty corresponding weights, with the weights being assigned according to performance. The final result of stereoscopic learning is the combination of sixty weighted classifiers in this example. Then, for any new and subsequent sample (i.e., new e-mails inputted), the combination of classifiers returns a result in the format of a discrete distribution over the categories, wherein result=p*SP+1−p*non-SP, where 0<p<1.

Figure 4A:
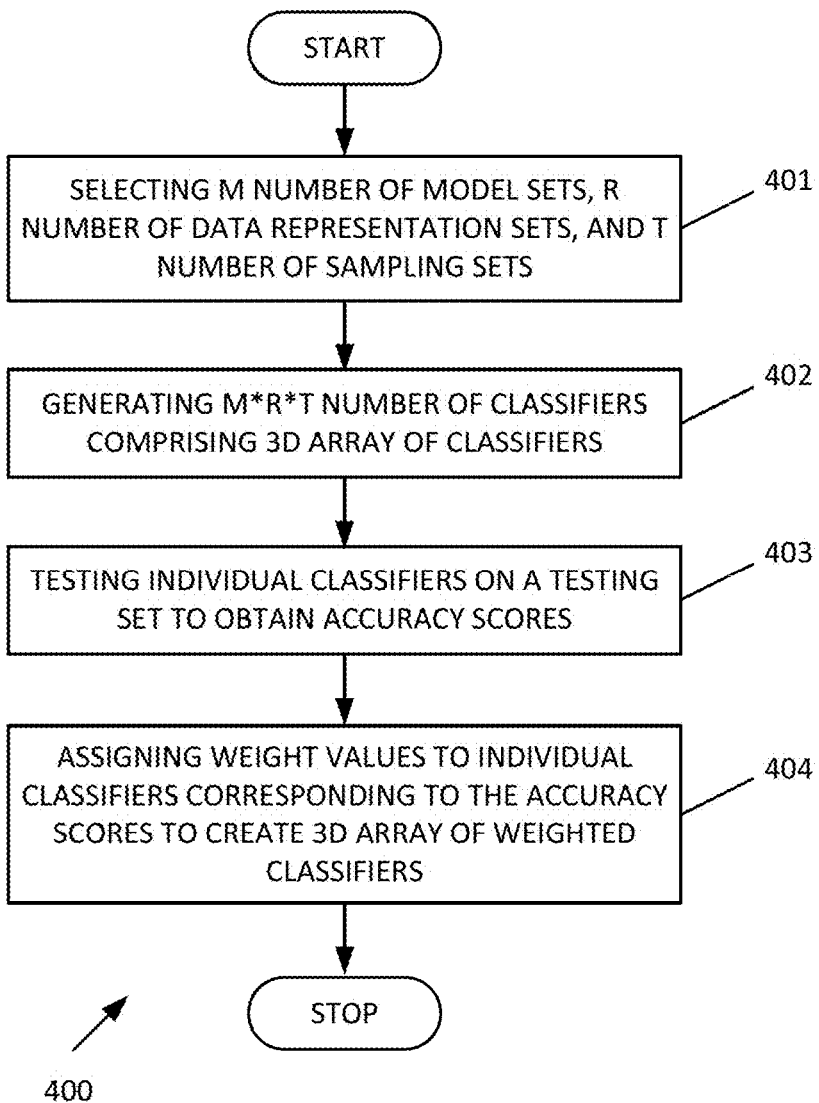
FIG. 4A is a flowchart of a method of classifying data according to an example embodiment.

FIG. 4A is a flowchart 400 of a method of classifying data according to an example embodiment. In step 401, M number of model sets, R number of data representation sets, and T number of sampling sets are selected. The numbers M, R, and T may be the same or different.

In step 402, the M number of model sets, the R number of data representation sets, and the T number of sampling sets are used in generating M*R*T number of classifiers.

The M*R*T number of classifiers comprise a three-dimensional (3D) array of classifiers.

In step 403, individual classifiers are tested on a testing set. Accuracy scores are generated for the individual classifiers. The accuracy scores comprise relative accuracies of individual classifiers when operating on the testing set.

In step 404, weight values are assigned to the classifiers in the 3D array of classifiers. The weight values correspond to the accuracy scores for the classifiers. However, the accuracy scores in some examples can be transformed into the weight values, such as through comparisons of individual accuracy scores to threshold values, threshold ranges, through the use of mathematical or algorithmic transformations, or transformed in other ways. The weight values control the contribution of individual classifiers of the 3D array of classifiers when the 3D array is operated on a data set. A classifier with a greater weight will have a greater effect than a classifier with a lower weight.

Figure 5A:
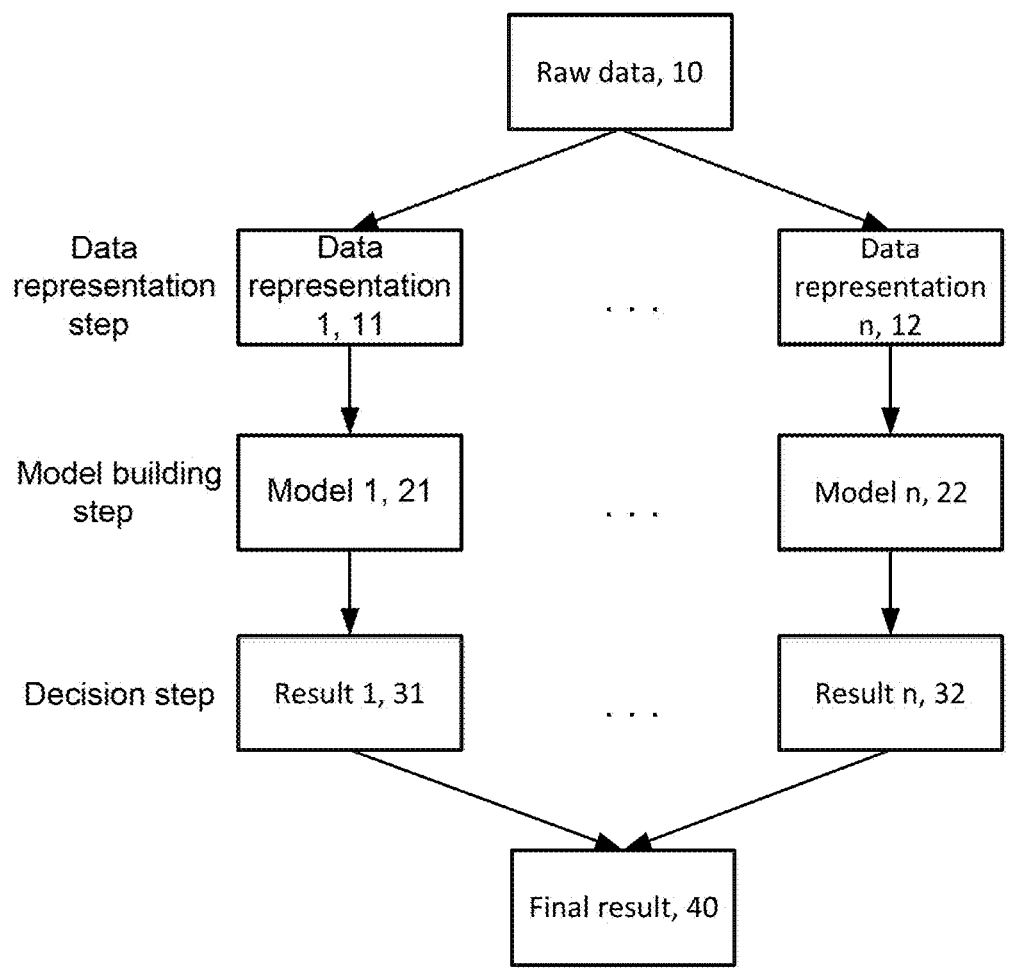
FIG. 5A depicts an example of ensemble learning.

Using multiple models to classify a data sample can have advantages compared to using a single model. For example, ensemble learning is a popular machine learning strategy which uses multiple algorithms to achieve a better performance in predicting an outcome such as a classification. For instance, the Random Forest method is a kind of ensemble learning over decision trees. The work flow of ensemble learning is illustrated in FIG. 5A.

Figure 4B:
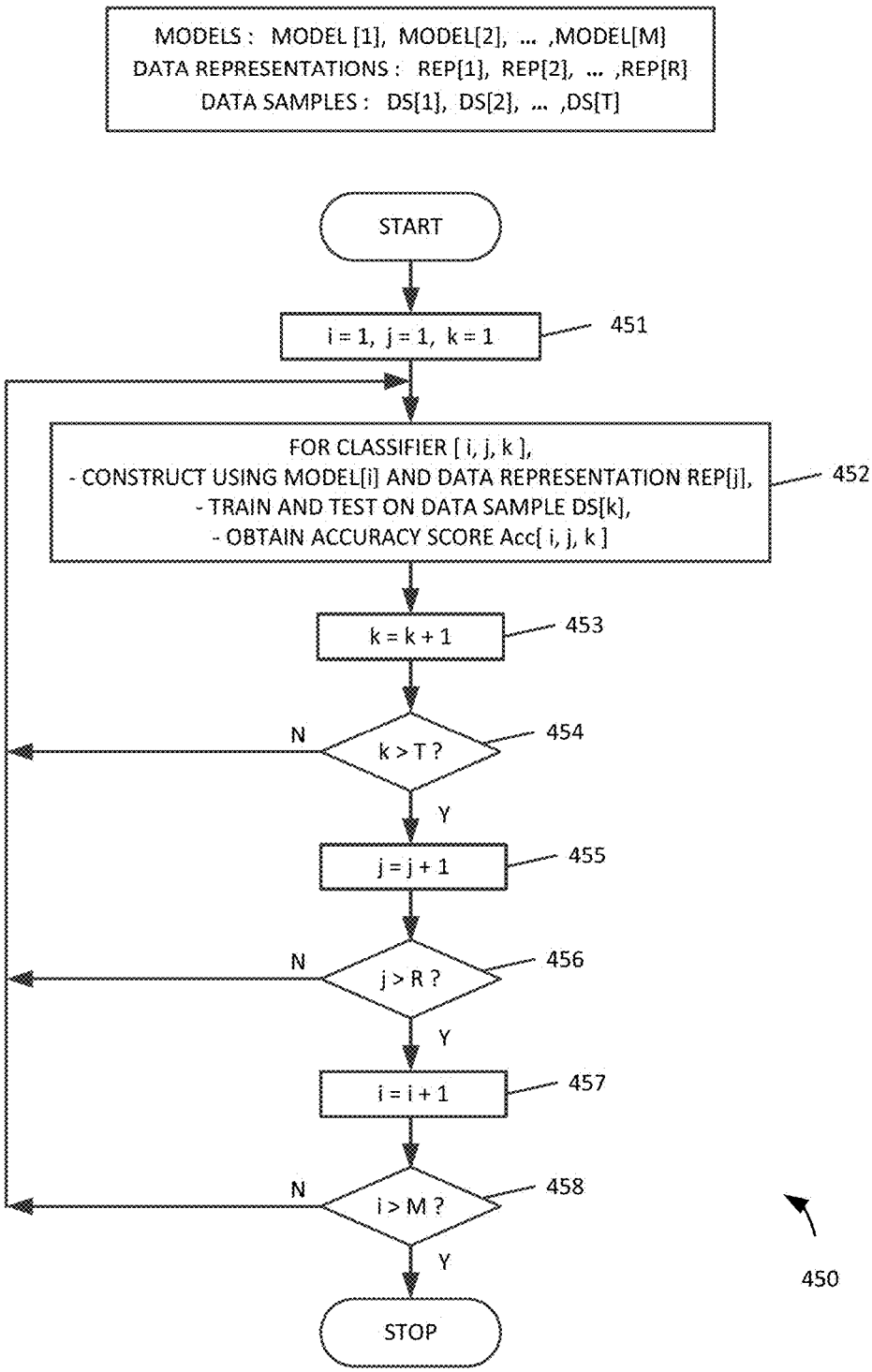
FIG. 4B shows a processing flow/iterations of a M*R*T classifiers generation process.

FIG. 4B shows a processing flow/iterations of a classifier generation process 450, including steps 451-458. Steps 451-458 are equivalent to steps 402-404 of FIG. 4A, with the exception of the weight values assignment of step 404 of FIG. 4A. The generation of the M*R*T classifiers starts with initialization of model sets MODEL[1]-MODEL[M], with initialization of data representation sets REP[1]-REP[R], and with initialization of data sample sets DS[1]-DS[T]. In step 451, initial values of i=1, j=1, and k=1 can be used to begin an iterative processing. This selecting and initializing is equivalent to step 401 of FIG. 4A.

In step 452, an individual classifier [i, j, k] is generated. This includes generating the classifier [i, j, k] using a selected model set MODEL[i] and a selected data representation set REP[j]. This also includes generating the classifier [i, j, k] by training and testing the classifier [i, j, k] on a selected data sample set DS[k]. The classifier [i, j, k] is completed by obtaining an accuracy score Acc[i, j, k] for the classifier [i, j, k]. In addition, a weight value can be assigned for each classifier [i, j, k] based on the accuracy score for the classifier [i, j, k].

In step 453, the value k is incremented.

In step 454, if the value k exceeds a limit T of the number of data sample sets to be used (i.e., if k>T), then the method proceeds to step 455 and the iteration of k has been completed. Otherwise, where the value k has not exceeded the limit T of the number of data sample sets to be used, then the method loops back to step 452 and generates a new classifier using the incremented k value.

In step 455, the value j is incremented.

In step 456, if the value j exceeds a limit R of the number of data representation sets to be used (i.e., if j>R), then the method proceeds to step 457 and the iteration of j has been completed. Otherwise, where the value j has not exceeded the limit R of the number of data representation sets to be used, then the method loops back to step 452 and generates a new classifier using the incremented j value.

In step 457, the value i is incremented.

In step 458, if the value i exceeds a limit M of the number of model sets to be used (i.e., if i>M), then the method exits and the iteration of i has been completed. Otherwise, where the value i has not exceeded the limit M of the number of model sets to be used, then the method loops back to step 452 and generates a new classifier using the incremented i value. The processing iteratively generates classifiers for all M, R, and T sets.

FIG. 5A depicts an example of ensemble learning. Raw data 10 is represented in n different ways, e.g., as data representation 1 (11), . . . , data representation n (12), in a data representation step. Each data representation is then used to build, e.g., train, a model in a model building step. For example, data representation 1 (11), . . . , data representation n (12), are used to build model 1 (21), . . . , model n (22), respectively. In a decision step, a result is provided from each model when the model processes a data representation of a new sample of data. A result 1 (31), . . . , result n (32) are provided by model 1 (21), . . . , model n (22), respectively. A final result 40 is then provided by combining the result from each model, e.g., result 1 (31), . . . , result n (32).

However, to achieve an accurate result, the data representation used to build the model is relevant. Data representation plays an important role in both statistics and machine learning, such as in feature selection (e.g., filter methods, wrapper method and embedded method) and feature extraction (principal/independent component analysis, multidimensional scaling, etc.). In practice, good data representation leverages machine learning more than the complicated models.

Feature engineering is becoming an important part of big data analysis. Big data analytics involves examining large data sets containing a variety of data types to uncover hidden patterns, unknown correlations, market trends, customer preferences and other useful business information. However, selection, independent of particular learning machines, is still an open problem even after years of endeavor.

Since the parallelization of ensemble learning is feasible for big data analysis, it provides an approach to revealing the latent facts provided by numerous results. For example, the Q&A system of IBM WATSON® utilizes ensemble learning to figure out the distribution of all possible results. IBM WATSON is a technology platform that uses natural language processing and machine learning to reveal insights from large amounts of unstructured data.

There are many ways to combine the prediction results of distinct models, for instance, by mode (or majority voting), weighted mean, etc. A stereoscopic learning process as described herein provides a statistical decision method based on testing performance. The process is stereoscopic because it allows training and testing of models to occur in parallel.

In one aspect, a technique provides multiple classifiers from different types of models, such as a parameterized support vector machine, a logistic regression model, a decision tree or a neural network. Each classifier represents a different version of a model which is separately trained from other versions of the model. The training can use supervised learning, for example. Each classifier is tested using testing data to provide a performance metric for the classifier. Moreover, the training process can occur in parallel for multiple models and the testing process can also occur in parallel. Further, the training and testing is repeated in multiple instances.

Once the models are trained and tested, they are ready to classify an unclassified sample of data. Different representations of the sample are provided as inputs to the classifiers, and each classifier provides a respective classification as an output. The respective classifications are combined according to their performance metrics, so that a classification with relatively higher performance metric is given a relatively higher weight. A final classification is then obtained for the sample. The training and testing can use a subset of the features of the samples of data. The classifying can similarly use a subset of features of the unclassified sample of data.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, numerous specific details are set forth in order to provide a thorough understanding. However, it will be clear to those of ordinary skill in the art that the embodiments may be practiced without such specific details.

Figure 5B:
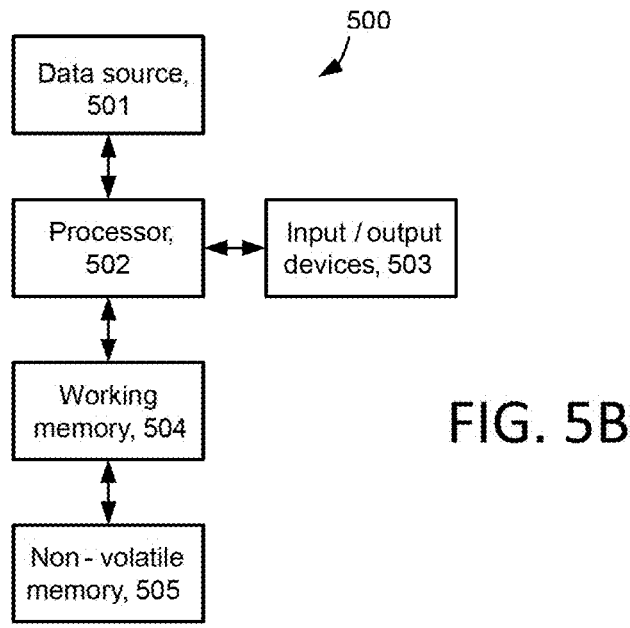
FIG. 5B depicts an example computing device.

FIG. 5B depicts an example computing device. The computing device 100 or computing node includes a data source 501, a processor 502, input/output devices 503, a working memory 504 and a non-volatile memory. Various computing devices may utilize all of the components shown, or only a subset of the components, and levels of integration may vary from device to device. Furthermore, a device may contain multiple instances of a component, such as multiple processing units, processors, memories, transmitters, receivers, etc. The data source may comprise a hardware storage device which stores samples of data which are to be processed. The processor may be any type of electronic data processor such as a CPU. The input/output devices may include network interfaces, storage interfaces, monitors, keyboards, pointing devices and the like. The working memory may store code, e.g., instructions which are executed by the processor to carry out the functions described herein. The code may be stored in the non-volatile memory and loaded into the working memory.

The memory/storage devices 501, 504 and 505 may comprise any type of system memory such as static random access memory (SRAM), dynamic random access memory (DRAM), synchronous DRAM (SDRAM), read-only memory (ROM), a solid state drive, hard disk drive, a magnetic disk drive, or an optical disk drive. The memory devices may include ROM for use at boot-up, and DRAM for program and data storage for use while executing programs. The memory devices may be non-transitory, hardware memory devices.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Figure 6A:
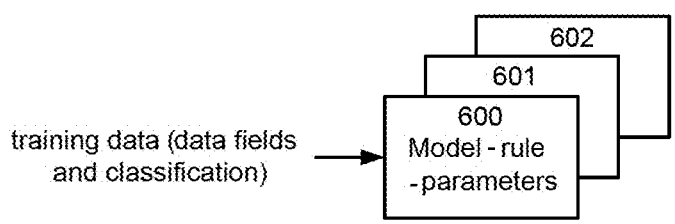
FIG. 6A depicts training of a set of models.

FIG. 6A depicts training of a set of models. Models 600, 601 and 602 are depicted. Each includes one or more rules and one or more parameters. Many types of models can be used, including a parameterized support vector machine, a logistic regression model, a decision tree or a neural network. For example, in a supervised learning process, the models are provided with input training data (e.g., data fields) and a desired output such as a classification of the input data. The rule is provided to map the input data to the desired output.

For instance, in the case of a credit card charge, input data can include the amount of the charge, a history of typical charges made by the user, the geographic location of the store in which the transaction was made, and the store identifier. The model then provides a rule to classify the charge as being fraudulent or not. The model may also output a probability or confidence metric for the classification. The charge can be denied if it is deemed to be fraudulent or otherwise questionable.

In the case of determining whether a wireless device user is likely to churn (e.g., cancel their service and change to a different wireless carrier), input data can include a measure of call quality over time, a record of whether the user has changed carriers in the past, and a record of whether the user has used the wireless device to visit web sites of competing carriers. The model then provides a rule to determine whether the user is likely or not likely to churn within a specified time frame such as the next three months. If the user is likely to churn, the current carrier can contact the user such as to offer a discount or incentive.

In another example, the input comprises data associated with an email, and the model classifies the email as being spam, e.g., unsolicited bulk email, or not. For instance, the input data can indicate whether certain words appear in the subject line or body of the email. For instance, the word "winner" in the body of the email is associated with spam a certain percentage of the time. In a simplified analysis, a probability that an email which includes "winner" is spam is Pwinner=P1/(P1+P2), where P1=probability that "winner" occurs in spam emails and P2=probability that "winner" occurs in non-spam emails. As another example, the probability of a spam email increases when the word "urgent" appears in the subject line. A probability that an email which includes "urgent" is spam is Purgent=P3/(P3+P4), where P3=probability that "urgent" occurs in spam emails and P4=probability that "urgent" occurs in non-spam emails. Further, these probabilities can be combined to provide an overall probability that an email is spam when it contains both "winner" and "urgent" as: P=Pwinner*Purgent/(Pwinner*Purgent+(1−Pwinner)(1−Purgent)). In the training process, the email samples are labeled as spam or not. For example, the user may label the emails manually. The model can thus adjust the probabilities, or coefficients of the probabilities, to derive a rule that provides the correct classification.

Figure 6B:
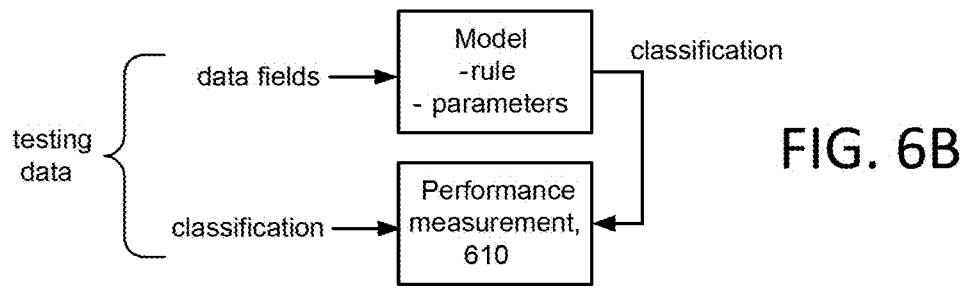
FIG. 6B depicts testing of a set of models.

FIG. 6B depicts testing of a set of models. Once a model has been trained, it can be tested to measure its performance and assign a corresponding performance metric. For example, the performance metric can range from 0 to 1 and indicate the portion of the time a model correctly classifies a sample of training data. The testing data include data fields which are input to the model. Using the rule and parameters, the model provides a classification as an output. The output classification is compared to the classification of the testing data at a performance measurement 610 component to determine if there is a match. By repeating this process, the performance metric can be determined.

Figure 7A:
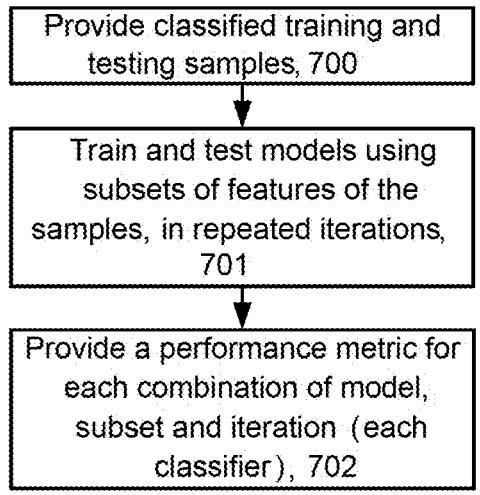
FIG. 7A depicts an overview of an example process for providing classifiers for classifying a sample of data.

FIG. 7A depicts an overview of an example process for providing classifiers for classifying a sample of data. A classifier represents a version of a model which is separately trained from other versions of the model. Step 700 includes providing classified training and testing samples. Step 701 includes training and testing models using subsets of features of the samples, in repeated iterations. Step 702 includes providing a performance metric for each combination of model, subset and iteration (e.g., for each classifier). A classifier may be denoted by Ltmr, where t is an index for the iteration, m is an index for the model and r is an index for a data representation of the subset. Each Ltmr may have a performance metric.

Figure 7B:
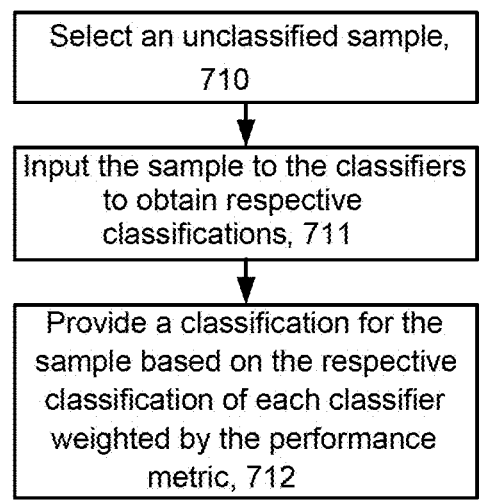
FIG. 7B depicts an overview of an example process for classifying a sample of data using the classifiers of FIG. 7A.

FIG. 7B depicts an overview of an example process for classifying a sample of data using the classifiers of FIG. 7A. Step 710 includes selecting an unclassified sample. Step 711 includes inputting the sample to the classifiers to obtain respective classifications. Step 712 includes providing a final classification for the sample based on the respective classification of each classifier weighted by the performance metric.

Figure 8A:
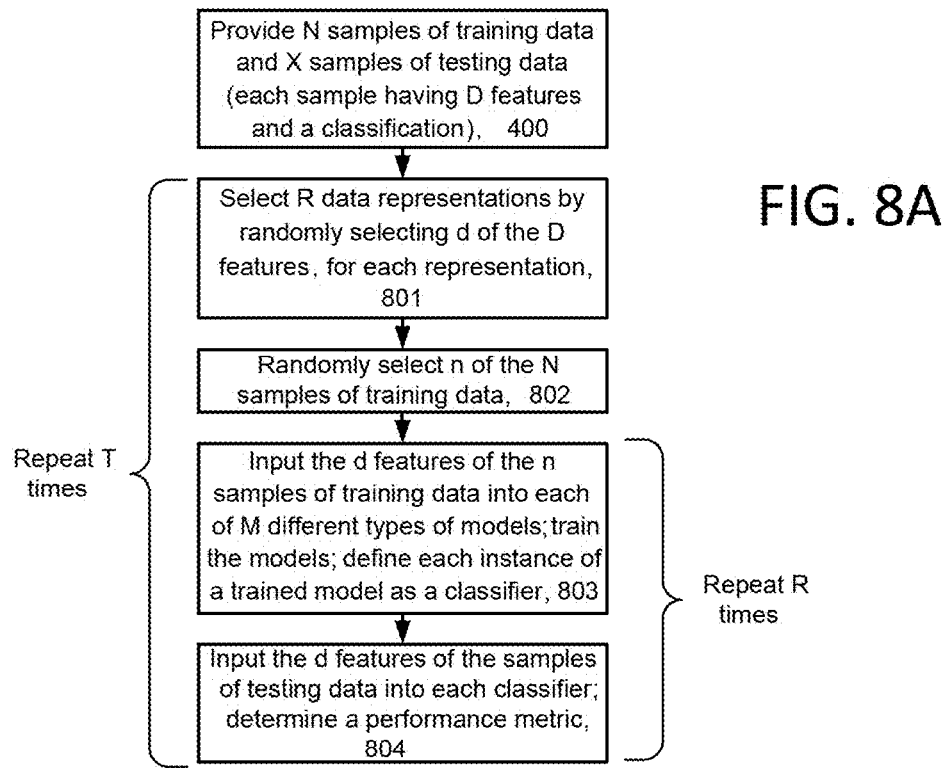
FIG. 8A depicts an example implementation of the process of FIG. 7A for providing classifiers for classifying a sample of data.

FIG. 8A depicts an example implementation of the process of FIG. 7A for providing classifiers for classifying a sample of data. Step 800 includes providing N samples of training data and X samples of testing data, where each sample has D features and a classification. N can be significantly greater than X. Step 801 includes selecting R data representations by randomly selecting d of the D features, for each representation. Step 802 includes randomly selecting n of the N samples of training data. For example, n can be significantly less than N. This reduces the computations in training the models. Step 803 includes inputting the d features of the n samples of training data into each of M different types of models, training the models using the inputs, and defining each instance of a trained model as a classifier. Step 804 includes inputting the d features of the samples of testing data into each classifier and determining a performance metric based on how often the classifier correctly classifies the samples. The sequence of steps 801-804 is repeated T times and steps 803 and 804 are repeated R times in each sequence. As a result, a number of classifiers which are defined is M*T*R. Example implementations of the process are provided further below.

In sum, a process for stereoscopic learning includes the following steps. [1] Given labeled training data with sample size N, where each sample point is D-dimensional, it is supposed that totally M distinct methods/models and R distinct data representations are used to train the classifier. For example, one data representation comprises d<=D randomly selected features. [2] Sample n<=N training data samples with replacement, and representing them by R data representations, respectively. The testing sets are the corresponding complements. [3] Based on [2], the learners/models are trained and tested. [4] Repeat steps [2] and [3] T times independently, and we have the following results. [5] We denote the learner/model m based on the t-th training data in the r-th data representation by Ltmr. Let Wtmr be the performance of Ltmr. The results of the Wtmr's provide us with a stereoscopic survey of data representation and modeling. By stereoscopic learning, the class of any new observation is distributed by:

$$\sum_{t,m,r=1}^{T,M,R} p_{tmr} L_{tmr}(x_{new}), \text{ where } p_{tmr} = \frac{w_{tmr}}{w} \text{ and} \quad (2)$$

$$W = \sum_{t,m,r=1}^{T,M,R} w_{tmr}$$

wherein Wtmr represents the performance metrics, Ltmr represents the versions of the models (classifiers); t is an index representing the T times; m is an index representing each of the M different types of models; r is an index representing the R subsets of the plurality of fields for the unclassified sample of data, and Xnew represents the unclassified sample of data.

For example, Random Forest is a special case of stereoscopic learning, where T=M=1. That is, only the decision tree model is considered, and training data are not resampled.

Figure 8B:
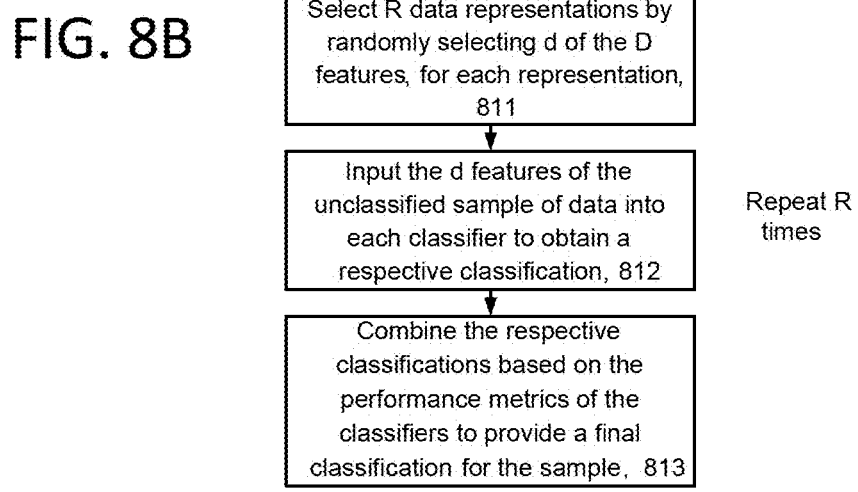
FIG. 8B depicts an example implementation of the process of FIG. 7B for classifying a sample of data.

FIG. 8B depicts an example implementation of the process of FIG. 7B for classifying a sample of data. Step 810 includes providing an unclassified sample of data having D features. Step 811 includes selecting R data representations by randomly selecting d of the D features, for each representation. Step 812 includes inputting the d features of the unclassified sample of data into each classifier to obtain a respective classification. Step 812 is repeated R times. Step 813 includes combining the respective classifications based on the performance metrics of the classifiers to provide a final classification for the sample. Example implementations of the process are provided further below.

Figure 9A:
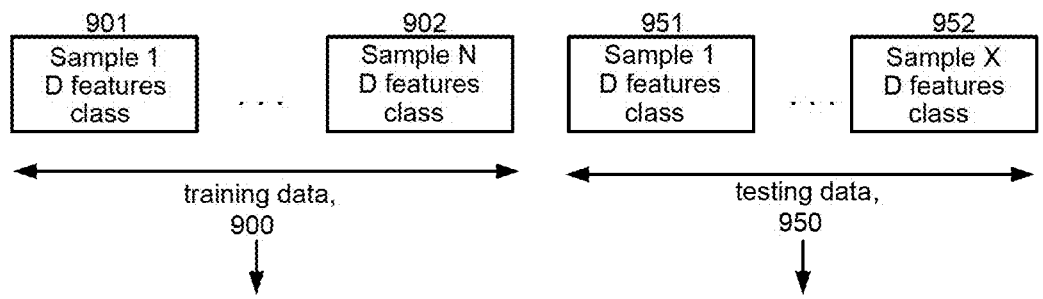
FIG. 9A depicts N samples of training data and X samples of testing data.

FIG. 9A depicts N samples of training data 900 and X samples of testing data 950. The training data includes samples 1 (901), . . . , sample N (902). Each sample has D features and a classification (class). The testing data includes samples 1 (951), . . . , sample X (952). Each sample has D features and a classification (class).

Figure 9B:
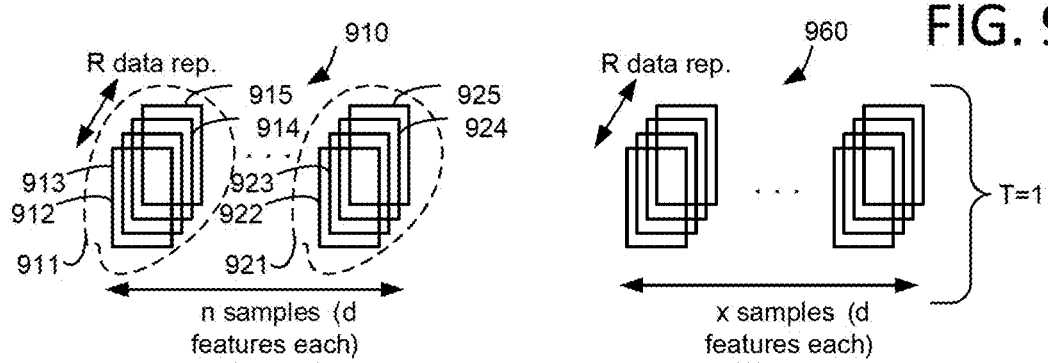
FIG. 9B depicts an example of R representations of n samples of training data and R representations of x samples of testing data, for a first iteration (T=1) of multiple iterations.
Figure 9C:
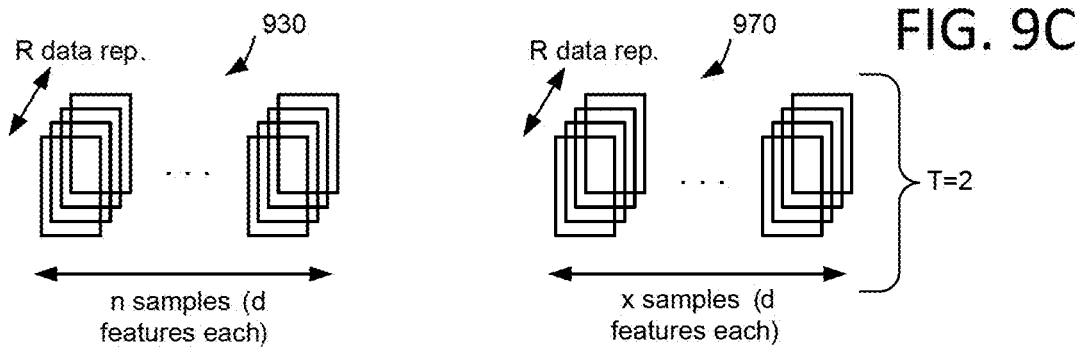
FIG. 9C depicts an example of R representations of n samples of training data and R representations of x samples of testing data, for a second iteration (T=2) of multiple iterations.
Figure 9D:
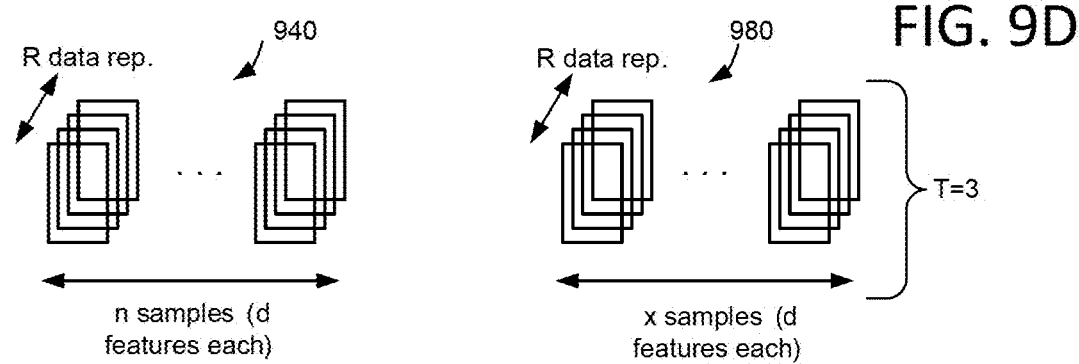
FIG. 9D depicts an example of R representations of n samples of training data and R representations of x samples of testing data, for a third iteration (T=3) of multiple iterations.

FIG. 9B to 9D depict samples of training and testing data which can be provided in each of the T iterations of FIG. 8A. In this example, there are four data representations for each of n samples. Further, each sample has d features, where d<D (or d=D). A sample has a data representation based on the number of features in the sample and the identity of the features. For example, FIG. 13 shows how the samples 901, . . . , 902 have D features. To illustrate, assume N=900, X=100, D=20, d=12, R=4 and n=10. Further, T=3 iterations of the sequence of steps 801-804 are provided. With d<D, the size or dimension of each of the samples in FIG. 9B to 9D is less than in FIG. 9A. The numbers N, X, D, d, R and n are positive integers.

FIG. 9B depicts an example of R representations of n samples of training data 910 and R representations of x samples of testing data 960, for a first iteration (T=1) of multiple iterations. A set of samples 911 includes samples 912, 913, 914 and 915, and a set of samples 921 includes samples 922, 923, 924 and 925. Each set of samples represents the same sample of training data but with different representations. The different representations of a sample may be referred to as sample instances.

Samples 912 and 922 have the same first data representation. For example, they may include features F2, F4, F5, F7, F8, F9, F10, F12, F13, F14, F17, F19 (FIG. 13). Samples 913 and 923 have the same second data representation. For example, they may include features, F1, F2, F4, F5, F8, F9, F12, F13, F16, F17, F19, F20. Samples 914 and 924 have the same third data representation. For example, they may include features F3, F4, F5, F6, F7, F8, F9, F10, F13, F16, F17, F19. Samples 915 and 925 have the same fourth data representation. For example, they may include features, F2, F3, F4, F5, F7, F8, F10, F11, F13, F15, F17, F19. Thus, each data representation may include a strict subset of the D features of the training data. Moreover, each data representation is different. They may include common features but are not identical. A data representation may be obtained by randomly selecting d of D features. If a duplicate is selected, a new, non-duplicate data representation may be selected in its place, in one approach.

During the T=1 iteration, n*R samples or sample instances of training data are provided. Similarly, x*R samples or sample instances of testing data are provided.

FIG. 9C depicts an example of R representations of n samples of training data 930 and R representations of x samples of testing data 970, for a second iteration (T=2) of multiple iterations. Different sets of samples are depicted in the same manner as in FIG. 9B. Four new data representations can be selected. In one approach, a data representation which is a duplicate of a data representation in a prior iteration is allowed. In another approach, a data representation which is a duplicate of a data representation in a prior iteration is discarded and a new non-duplicate data representation is selected.

FIG. 9D depicts an example of R representations of n samples of training data 940 and R representations of x samples of testing data 980, for a third iteration (T=3) of multiple iterations. Different sets of samples are depicted in the same manner as in FIG. 9B. After the T=3 iteration is completed, a total of n*R*T samples or sample instances of training data are provided and used to train the models. Further, M types of models are used, so that M*R*T classifiers are created. In one approach, n>M.

Figure 10A:
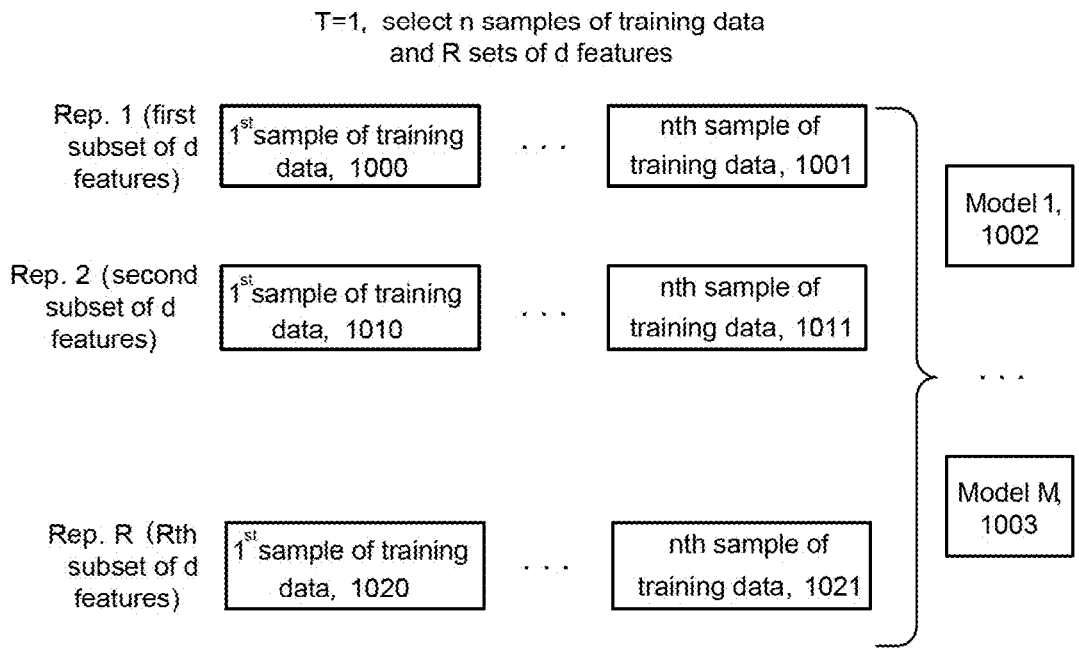
FIG. 10A depicts an example of 1st through nth samples of training data, with 1st through Rth representations, being input to 1st through Mth models, consistent with FIG. 9B.

FIG. 10A depicts an example of 1st through nth samples of training data, with 1st through Rth representations, being input to 1st through Mth models, consistent with FIG. 9B. This occurs during a T=1 iteration of the sequence of steps 801-804. Rep. 1, Rep. 2 and Rep. R, are first, second and Rth data representations, respectively, of first, second and Rth subsets of d features, respectively. Model 1 (1002), . . . , model M (1003) are also depicted. Each model may be of a different type. For Rep. 1, a first sample 1000 through an nth sample 1001 are provided. For Rep. 2, a first sample 1010 through an nth sample 1011 are provided. For Rep. R, a first sample 1020 through an nth sample 1021 are provided. Each of the R*n samples of training data is input to train each model, in one approach.

Figure 10B:
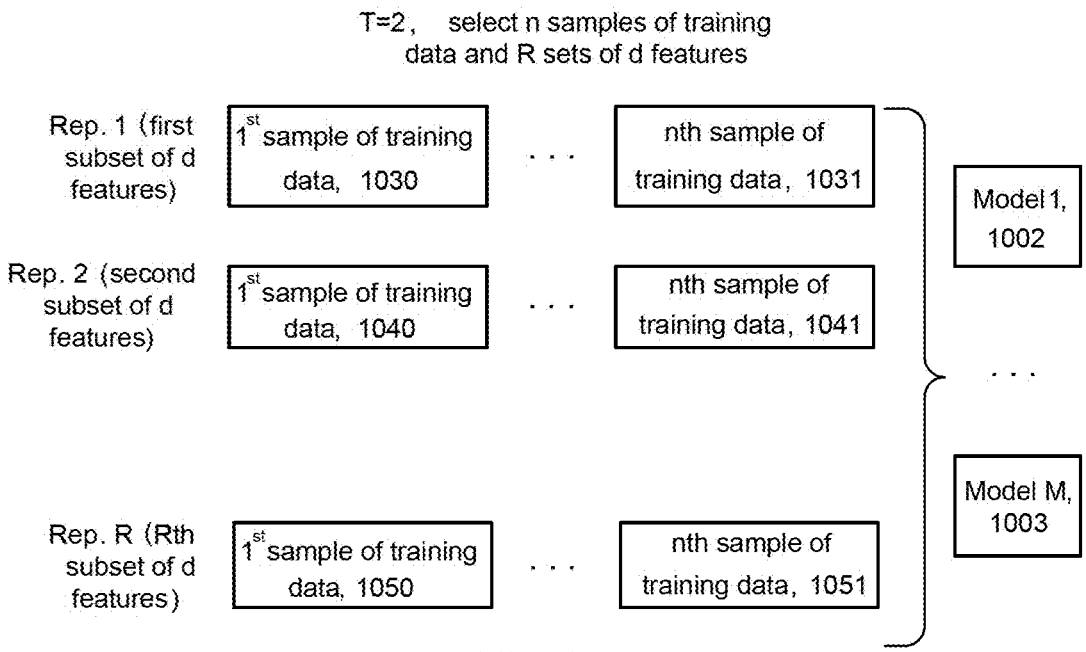
FIG. 10B depicts an example of 1st through nth samples of training data, with 1st through Rth representations, being input to 1st through Mth models, consistent with FIG. 9C.

FIG. 10B depicts an example of 1st through nth samples of training data, with 1st through Rth representations, being input to 1st through Mth models, consistent with FIG. 9C. This occurs during a T=2 iteration of the sequence of steps 801-804. Rep. 1, Rep. 2 and Rep. R, are first, second and Rth data representations, respectively, of first, second and Rth subsets of d features, respectively. Each representation is unique, in one approach. Model 1 (1002), . . . , model M (1003) are also depicted. For Rep. 1, a first sample 1030 through an nth sample 1031 are provided. For Rep. 2, a first sample 1040 through an nth sample 1041 are provided. For Rep. R, a first sample 1050 through an nth sample 1051 are provided. Each of the R*n samples of training data is input to train each model, in one approach. Thus, a total of 2*R*n samples of training data have been input to train each model, in one approach, when the T=2 iteration is performed.

Figure 10C:
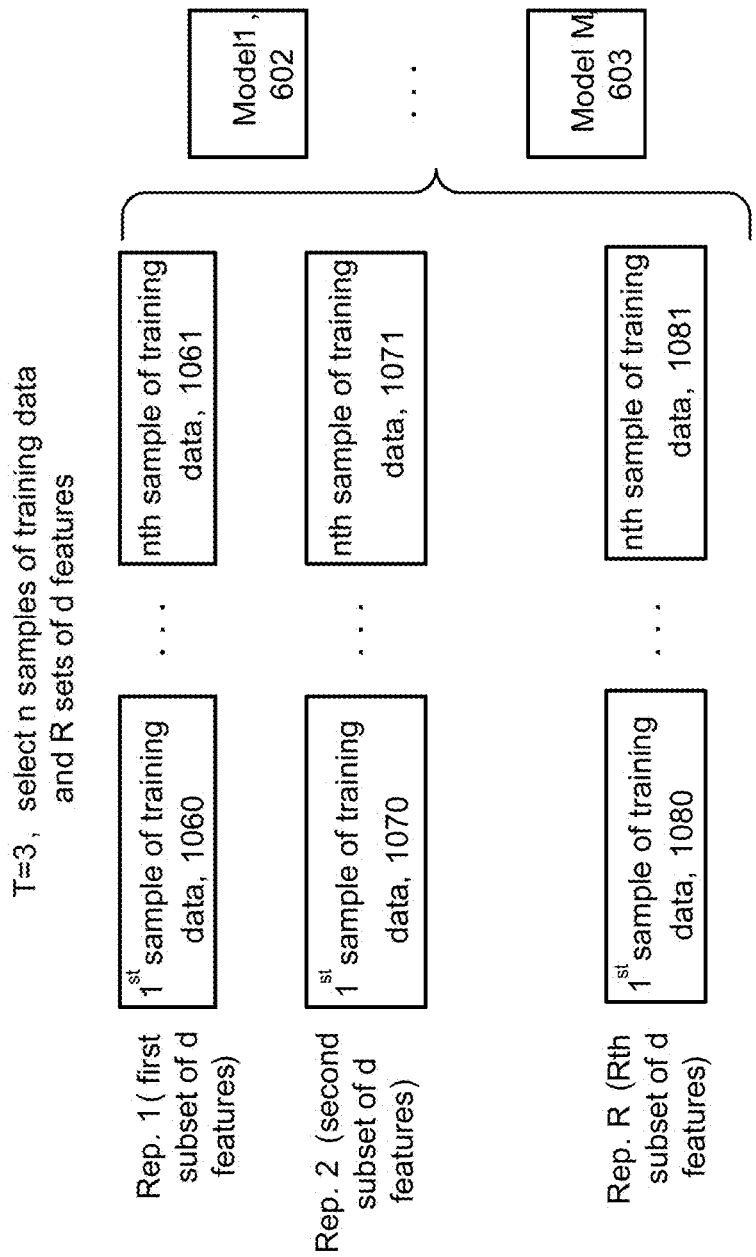
FIG. 10C depicts an example of 1st through nth samples of training data, with 1st through Rth representations, being input to 1st through Mth models, consistent with FIG. 9D.

FIG. 10C depicts an example of 1st through nth samples of training data, with 1st through Rth representations, being input to 1st through Mth models, consistent with FIG. 9D. This occurs during a T=3 iteration of the sequence of steps 801-804. Rep. 1, Rep. 2 and Rep. R, are first, second and Rth data representations, respectively, of first, second and Rth subsets of d features, respectively. Each representation is unique, in one approach. Model 1 (1002), . . . , model M (1003) are also depicted. For Rep. 1, a first sample 1060 through an nth sample 1061 are provided. For Rep. 2, a first sample 1070 through an nth sample 1071 are provided. For Rep. R, a first sample 1080 through an nth sample 1081 are provided. Each of the R*n samples of training data is input to train each model, in one approach. Thus, a total of 3*R*n samples of training data have been input to train each model, in one approach, when the T=3 iteration is performed.

Figure 10D:
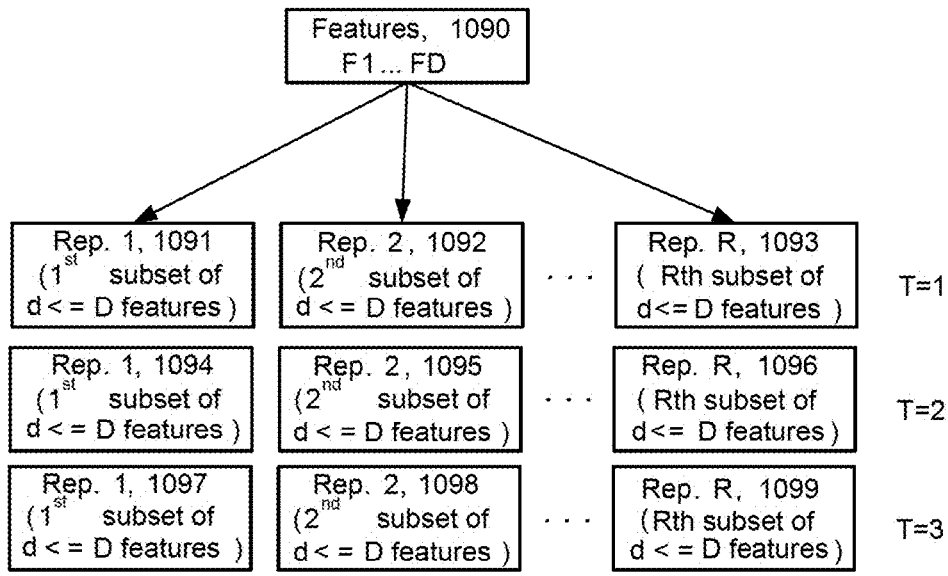
FIG. 10D depicts 1st through Rth representations for instances T=1, 2 and 3, consistent with FIG. 9B to 10C.

FIG. 10D depicts 1st through Rth representations for instances T=1, 2 and 3, consistent with FIG. 9B to 10C. This shows how T sets of R data representations are selected. A block 1090 represents the set of a plurality of available features F1, . . . , FD. For T=1, blocks 1091, 1092, . . . , 1093 represent first, second, . . . , Rth subsets, respectively, of d<=D features. For T=2, blocks 1094, 1095, . . . , 1096 represent first, second, . . . , Rth subsets, respectively, of d<=D features. For T=3, blocks 1097, 1098, . . . , 1099 represent first, second, . . . , Rth subsets, respectively, of d<=D features.

Figure 11:
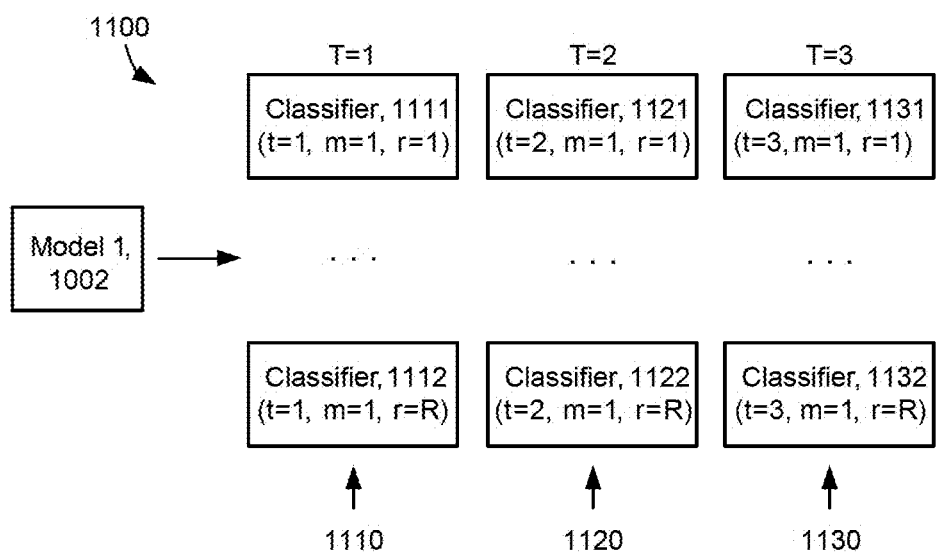
FIG. 11 depicts a model of a first type being used to provide separate classifiers, where one classifier is provided for each trained version of the model.

FIG. 11 depicts a model of a first type 1002 being used to provide separate classifiers, where one classifier is provided for each trained version of the model. In this example, a set 1100 of a number T*R classifiers is provided for each model type. A set of R classifiers 1110 includes classifiers 1111, . . . , 1112 represented by a set of indexes (t=1, m=1, r=1), . . . , (t=1, m=1, r=R). A set of R classifiers 1120 includes classifiers 1121, . . . , 1122 represented by a set of indexes (t=2, m=1, r=1), . . . , (t=2, m=1, r=R). A set of R classifiers 1130 includes classifiers 1131, . . . , 1132 represented by a set of indexes (t=3, m=1, r=1), . . . , (t=3, m=1, r=R), respectively.

Figure 12A:
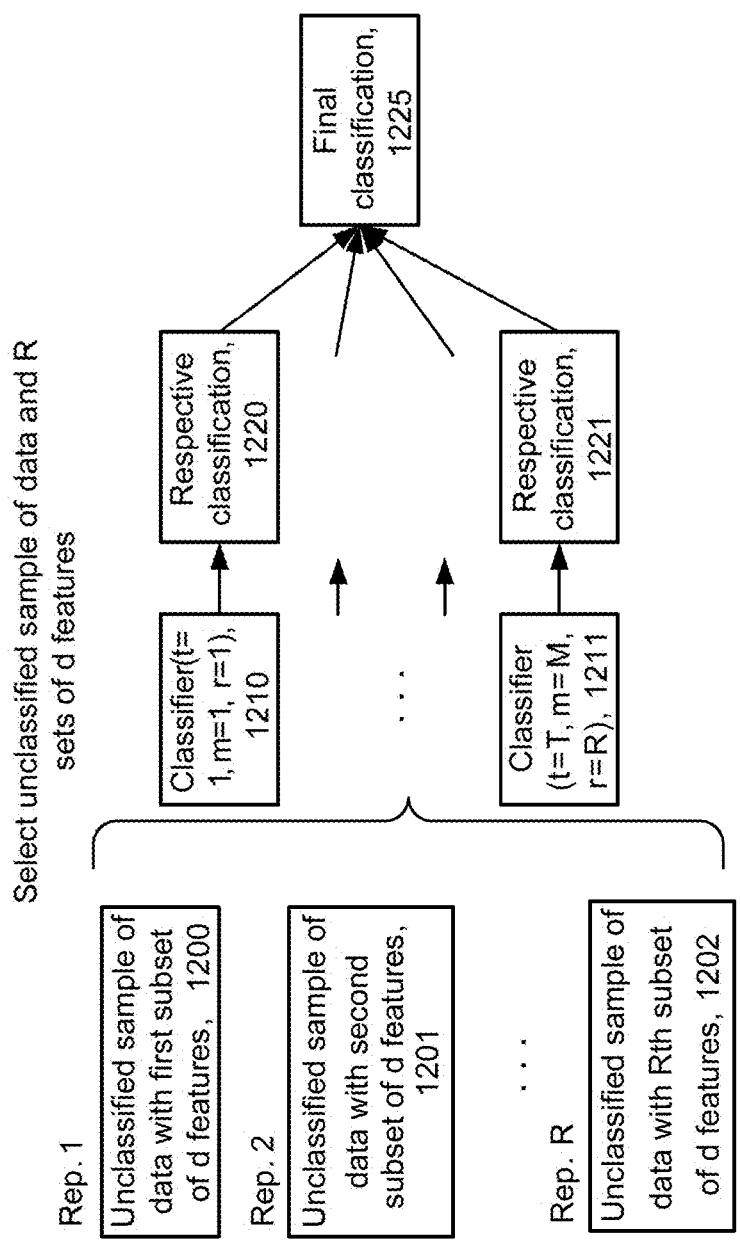
FIG. 12A depicts an unclassified sample of data being input to 1st through M*T*Rth classifiers to provide a final classification.

FIG. 12A depicts an unclassified sample of data being input to 1st through M*T*Rth classifiers to provide a final classification. There are R instances of the sample, one for each data representation. The samples include an unclassified sample of data with a first subset of d features 1200, an unclassified sample of data with a second subset of d features 1201, . . . , and an unclassified sample of data with an Rth subset of d features 1202. One approach is to input a sample instance to a set of classifiers. For example, see FIG. 12B.

Another approach is to generate additional sample instances so there is one sample instance for each classifier. The additional sample instances can be generated similar to the way in which the sample instances of training data were generated in FIG. 8A.

The sample instances of the unclassified sample are provided to a number T*M*R of classifiers including classifiers 1210, . . . , 1211 represented by a set of indexes (t=1, m=1, r=1), . . . , (t=T, m=M, r=R), respectively. The classifiers 1210, . . . , 1211 provide respective classifications 1220, . . . , 1221 which are combined with weights based on their performance metrics to provide a final classification 1225.

Figure 12B:
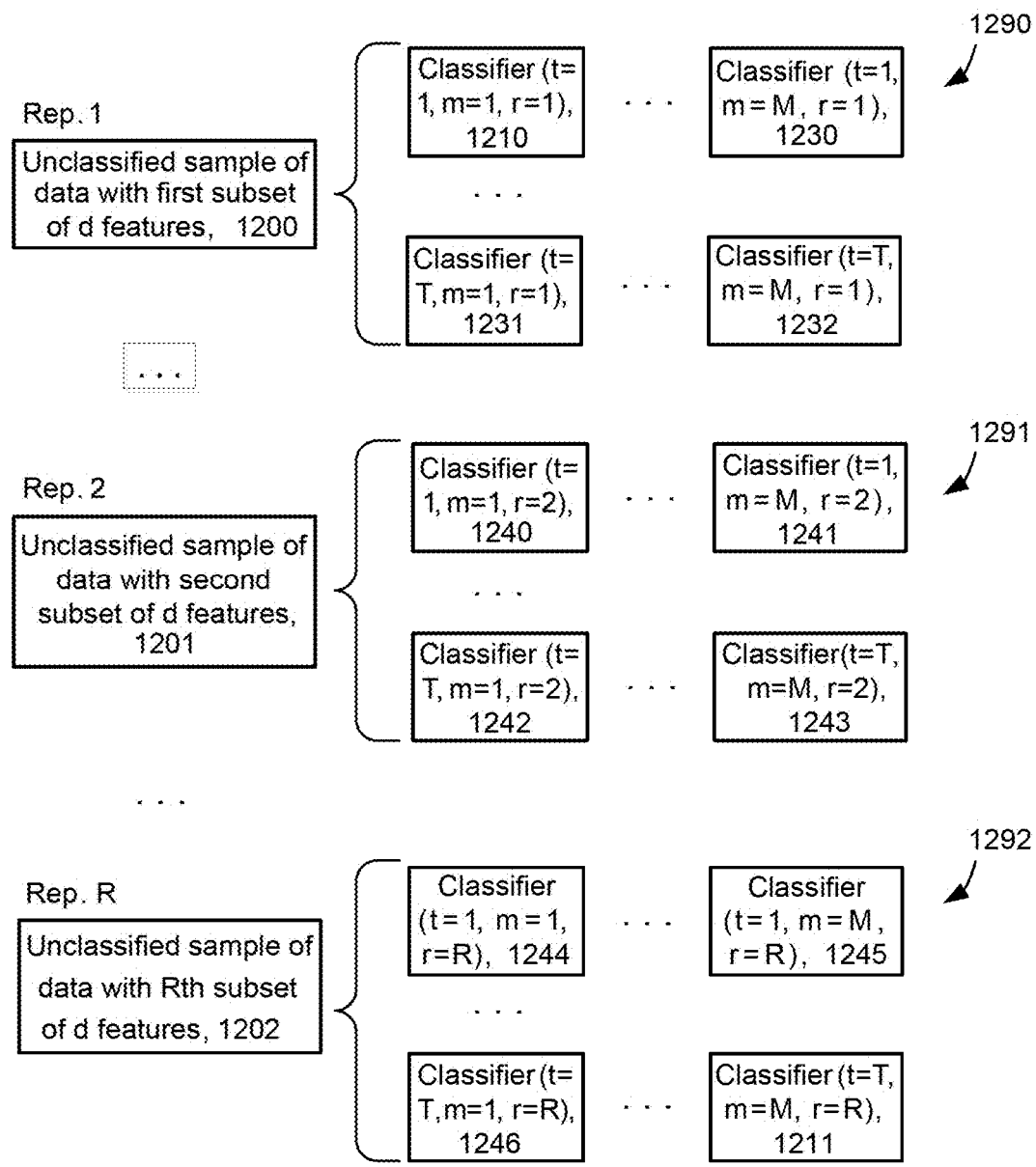
FIG. 12B depicts one specific example of representations of an unclassified sample of data being input to classifiers.

FIG. 12B depicts one specific example of representations of an unclassified sample of data being input to classifiers. R sets of classifiers 1290, 1291, . . . , 1292 are depicted. The unclassified sample of data with a first subset of d features 1200 is input to classifiers 1210, . . . , 1230, represented by a set of indexes (t=1, m=1, r=1), . . . , (t=1, m=M, r=1), respectively, and to classifiers 1231, . . . , 1232, represented by a set of indexes (t=T, m=1, r=1), . . . , (t=T, m=M, r=1), respectively, and to the classifiers between the depicted classifiers.

The unclassified sample of data with a second subset of d features 1201 is input to classifiers 1240, . . . , 1241, represented by a set of indexes (t=1, m=1, r=2), . . . , (t=1, m=M, r=2), respectively, and to classifiers 1242, . . . , 1243, represented by a set of indexes (t=T, m=1, r=2), . . . , (t=T, m=M, r=2), respectively, and to the classifiers between the depicted classifiers.

The unclassified sample of data with an Rth subset of d features 1202 is input to classifiers 1244, . . . , 1245, represented by a set of indexes (t=1, m=1, r=R), . . . , (t=1, m=M, r=R), respectively, and to classifiers 1246, . . . , 1211, represented by a set of indexes (t=T, m=1, r=R), . . . , (t=T, m=M, r=R), respectively, and to the classifiers between the depicted classifiers.

FIG. 13 depicts an example of features in a sample. An example ith sample can have a classification field which has a value of 0 or 1, indicating one of two possible classifications. In this case, a single bit can be used. For example, the classification of an email can be spam or not spam, the classification of a credit card charge can be fraudulent or not fraudulent, and the classification of a wireless device user can be likely or not likely to churn in the next three months. In another approach, the number of possible classifications is more than two.

In a specific example for spam email, the features can include: an indicator for whether the email was addressed to more than one recipient, whether the "from" field is blank, whether anyone was CCed, whether the sender had been sent an email in the last 30 days, whether any images were attached, whether any files were attached, whether keywords such as "dollar," "winner," "inherit," or "password" appear in the email, the number of characters in the email, the number of line breaks in the email, whether the email was written using HTML, whether the subject starts with "Re:", whether there is an exclamation point in the subject, whether the word "urgent" is in the email subject, and a time stamp indicating a time the email was sent.

The techniques provided herein have a number of advantages. First, the data representation and model selection are involved in the stereoscopic learning, which provides an overview of the influence of these two important factors by ANOVA (analysis of variance). Second, the proposed stereoscopic learning strategy facilitates comparisons of the different types of models, and enhance the capability of ensemble learning. Third, the parallelization of stereoscopic learning is intrinsic. This is desirable and feasible in the practice of big data analysis. Fourth, the resampling techniques make it possible to analyze the robustness of models, as well as data representations. For example, a smaller variance shows a better robustness. Fifth, the prediction of a new sample point is a discrete distribution over classes, which is more flexible than the point estimation. For instance, the prediction can be the probability of belonging to some given classes. Sixth, the illustration of the stereoscopic learning results is intuitive and heuristic, and therefore helpful to subsequent explorative analysis.

The proposed stereoscopic learning process considers the aspects of model selection and data representation simultaneously in a natural parallel way. Further, it makes a model comparison in the same training and testing environments. The fairness of the evaluation is guaranteed by the resampling techniques. Also, the stereoscopic learning provides a platform to the feature selection, independent of the particular learners. It also makes it possible to evaluate the factors of the model and data representation by means of statistical analysis, e.g., hypothesis testing of independence, ANOVA, etc.

The stereoscopic learning can improve the performance of classification, which can be widely used in prediction systems and benefits various industries. Example applications include churn analysis, customer behavior modeling, email spam detection and detection of fraudulent credit card charges. The process is also helpful in selecting satisfying models. In practice, model comparison is usually time-consuming. The proposed learning method is naturally parallelizable.

Since the proposed method is applicable to big data analysis by means of large-scale parallel computing, the statistical facts explored from numerous candidate results are more flexible and more useful for the further study and applications. For example, it is capable of exploring the distribution of possible result from any stereoscopic angle, rather than a unique "optimal" result in general case. In summary, the proposed method can provide benefits in automatic and intelligent decision making.

The proposed learning strategy enhances big data analysis, especially in terms of feature selection. As a result, we may find more latent relationships between features, including the causal relationships of concern. The strategy addresses both model selection and data representation, the two most important issues in machine learning and pattern recognition. By resampling, the risk of the over-fitting problem is reduced, so that we may benefit from saving the training costs, under the premise of guaranteeing the performance.

Further, the visualization of stereoscopic learning results is intuitive and easy to understand, even for beginners in the field of machine learning. Moreover, it is heuristic and helpful to further explore the combined effect of model and data representation. Another commercial benefit comes from the fact that the ease of utilizing stereoscopic learning on the practical problems shortens the development cycle.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of classifying data, comprising the computer-implemented steps of:
   selecting a M number of model sets;
   selecting a R number of data representation sets of training data, wherein the selecting of the R number of data representation sets is performed a T number of times, and for each of the T times, the data representation sets comprise different subsets of features of the training data;
   selecting a T number of sampling sets of the training data based on the T times in which the R data representation sets are selected;
   generating a M*R*T number of classifiers comprising a three-dimensional (3D) array of classifiers, wherein M, R and T are numbers greater than one, where M*R*T represents M multiplied by R, multiplied by T, and the generating comprises training each of M models using each of the T number of sampling sets of training data;
   testing each individual classifier in the 3D array of classifiers on a testing set to obtain accuracy scores for the each individual classifier; and
   assigning a weight value to the each individual classifier corresponding to each accuracy score, wherein the 3D array of classifiers comprises a 3D array of weighted classifiers.

2. The method of claim 1, further comprising normalizing the weight values of the 3D array of classifiers.

3. The method of claim 1, wherein when operated on an inputted data set, the 3D array of classifiers returns a prediction.

4. The method of claim 1, wherein when operated on an inputted data set, the 3D array of classifiers returns a prediction as a probability distribution over categories.

5. The method of claim 1, wherein the 3D array of classifiers comprises a comparison of model sets in the M number of model sets.

6. The method of claim 1, wherein the 3D array of classifiers comprises a comparison of data representation sets in the R number of data representation sets.

7. The method of claim 1, wherein the 3D array of classifiers comprises a comparison of sampling sets in the T number of sampling sets.

8. The method of claim 1, with the generating the M*R*T number of classifiers comprising training and testing the M*R*T number of classifiers.

9. The method of claim 1, with the generating the M*R*T number of classifiers comprising training and testing the M*R*T number of classifiers, wherein the training and the testing are performed in parallel.

10. The method of claim 1, wherein the models comprise one or more of a parameterized support vector machine, a logistic regression model, a decision tree, or a neural network.

11. The method of claim 1, wherein a particular accuracy score of a particular individual classifier is converted into a particular weight value for the particular individual classifier using a predetermined statistical analysis.

12. The method of claim 1, wherein the selecting and generating are performed using parallel computing.

13. The method of claim 1, wherein:
   for each of the T times, the selecting of the R data representation sets of training data is random.

14. The method of claim 1, wherein:
   for each of the T times, the selecting of each of the R data representation sets of training data comprises selecting d of D features of the training data, where d<D.

15. The method of claim 1, wherein:
   for each of the T times, the selecting of each of the R data representation sets of training data comprises randomly selecting d of D features of the training data, where d<D.

16. The method of claim 1, wherein:
   for each of the T times, each of the R data representation sets of training data is unique.

17. The method of claim 1, further comprising:
   classifying an unclassified sample of data using the set of weighted classifiers.

18. The method of claim 1, wherein:
   the training data comprises an N number of samples; and
   each sampling set is obtained by randomly selecting n of the N number of samples, where n<N.

19. A processing device, comprising:
   a non-transitory memory storage comprising instructions; and
   one or more processors in communication with the memory, wherein the one or more processors execute the instructions to:
   select a M number of model sets;
   select a R number of data representation sets of training data, wherein the selecting of the R number of data representation sets is performed a T number of times, and for each of the T times, the data representation sets comprise different subsets of features of the training data;
   select a T number of sampling sets of the training data based on the T times in which the R data representation sets are selected;
   generate a M*R*T number of classifiers comprising a three-dimensional (3D) array of classifiers, wherein M, R and T are numbers greater than one, where M*R*T represents M multiplied by R, multiplied by T, and the generating comprises training each of M models using each of the T number of sampling sets of training data;
   test each individual classifier in the 3D array of classifiers on a testing set to obtain accuracy scores for the each individual classifier; and
   assign a weight value to the each individual classifier corresponding to each accuracy score, wherein the 3D array of classifiers comprises a 3D array of weighted classifiers.

20. The processing device of claim 19, further comprising normalizing the weight values of the 3D array of classifiers.

21. The processing device of claim 19, wherein when operated on an inputted data set, the 3D array of classifiers returns a prediction.

22. The processing device of claim 19, wherein when operated on an inputted data set, the 3D array of classifiers returns a prediction as a probability distribution over categories.

23. The processing device of claim 19, wherein the 3D array of classifiers comprises a comparison of model sets in the M number of model sets.

24. The processing device of claim 19, wherein the 3D array of classifiers comprises a comparison of data representation sets in the R number of data representation sets.

25. The processing device of claim 19, wherein the 3D array of classifiers comprises a comparison of sampling sets in the T number of sampling sets.

26. The processing device of claim 19, with the generating the M*R*T number of classifiers comprising training and testing the M*R*T number of classifiers.

27. The processing device of claim 19, with the generating the M*R*T number of classifiers comprising training and testing the M*R*T number of classifiers, wherein the training and the testing are performed in parallel.

28. The processing device of claim 19, wherein the models comprise one or more of a parameterized support vector machine, a logistic regression model, a decision tree, or a neural network.

* * * * *